United States Patent
Inoue et al.

(10) Patent No.: US 10,483,539 B2
(45) Date of Patent: Nov. 19, 2019

(54) POSITIVE ELECTRODE ACTIVE MATERIAL FOR NON-AQUEOUS ELECTROLYTE SECONDARY BATTERIES, PRODUCTION PROCESS THEREFOR, AND NON-AQUEOUS ELECTROLYTE SECONDARY BATTERY

(71) Applicant: SUMITOMO METAL MINING CO., LTD., Tokyo (JP)

(72) Inventors: Katsuya Inoue, Ehime (JP); Hiroyuki Toya, Ehime (JP)

(73) Assignee: SUMITOMO METAL MINING CO., LTD., Tokyo (JP)

( * ) Notice: Subject to any disclaimer, the term of this patent is extended or adjusted under 35 U.S.C. 154(b) by 382 days.

(21) Appl. No.: 15/500,135

(22) PCT Filed: Jul. 1, 2015

(86) PCT No.: PCT/JP2015/069008
§ 371 (c)(1),
(2) Date: Jan. 30, 2017

(87) PCT Pub. No.: WO2016/017360
PCT Pub. Date: Feb. 4, 2016

(65) Prior Publication Data
US 2017/0263930 A1    Sep. 14, 2017

(30) Foreign Application Priority Data

Jul. 31, 2014 (JP) ................................. 2014-157102

(51) Int. Cl.
*H01M 4/505* (2010.01)
*H01M 4/525* (2010.01)
(Continued)

(52) U.S. Cl.
CPC .......... *H01M 4/505* (2013.01); *C01G 53/006* (2013.01); *C01G 53/50* (2013.01); *H01M 4/0471* (2013.01);
(Continued)

(58) Field of Classification Search
None
See application file for complete search history.

(56) References Cited

U.S. PATENT DOCUMENTS

2013/0078520 A1    3/2013    Toya et al.
2014/0154555 A1    6/2014    Endoh et al.

FOREIGN PATENT DOCUMENTS

JP    2009-217981 A    9/2009
JP    2011-116580 A    6/2011
(Continued)

OTHER PUBLICATIONS

Fukui et al. (WO 2012/169274) (a raw machine translation) (Abstract) (Dec. 13, 2012) (Year: 2012).*

(Continued)

*Primary Examiner* — Carmen V Lyles-Irving
(74) *Attorney, Agent, or Firm* — Oliff PLC

(57) ABSTRACT

A positive electrode active material for a non-aqueous electrolyte secondary battery, which enables a non-aqueous electrolyte secondary battery to achieve great battery characteristics, and a process for producing the material, as well as a non-aqueous electrolyte secondary batter. Provided is a positive electrode active material for a non-aqueous electrolyte secondary battery, where secondary particles of lithium-nickel-cobalt-manganese composite oxide particles are composed of outer-shell parts with a high manganese concentration and central parts with a low manganese concentration, which are lower in manganese concentration than the outer-shell parts, primary particles constituting the outer- (Continued)

shell parts of the secondary particles with the high manganese concentration are composed of outer peripheral parts with a low manganese concentration and inner parts with a high manganese concentration, and the ratio of the manganese concentration in the inner part to the manganese concentration in the outer peripheral part is 1.5 to 2.5 in the primary particles.

10 Claims, 3 Drawing Sheets

(51) Int. Cl.
*H01M 4/04* (2006.01)
*H01M 10/0525* (2010.01)
*C01G 53/00* (2006.01)
*H01M 4/02* (2006.01)

(52) U.S. Cl.
CPC ....... *H01M 4/525* (2013.01); *H01M 10/0525* (2013.01); *C01P 2004/03* (2013.01); *C01P 2004/04* (2013.01); *C01P 2004/61* (2013.01); *C01P 2004/84* (2013.01); *H01M 2004/028* (2013.01); *Y02T 10/7011* (2013.01)

(56) References Cited

FOREIGN PATENT DOCUMENTS

| JP | 2012-254889 A | 12/2012 |
| JP | 2012-256435 A | 12/2012 |
| JP | 2014-112476 A | 6/2014 |
| JP | 2014-123529 A | 7/2014 |
| JP | WO2012/169274 A1 | 2/2015 |

OTHER PUBLICATIONS

Fukui et al. (WO 2012/169274) (a raw machine translation) (Detailed Description) (Dec. 13, 2012) (Year: 2012).*
Oct. 6, 2015 International Search Report issued in Patent Application No. PCT/JP2015/069008.

* cited by examiner

POSITIVE ELECTRODE ACTIVE MATERIAL FOR NON-AQUEOUS ELECTROLYTE SECONDARY BATTERIES, PRODUCTION PROCESS THEREFOR, AND NON-AQUEOUS ELECTROLYTE SECONDARY BATTERY

BACKGROUND OF THE INVENTION

Field of the Invention

The present invention relates to a positive electrode active material for non-aqueous electrolyte secondary batteries, production process therefor, and non-aqueous electrolyte secondary battery. More particularly, the invention relates to a positive electrode active material that uses a nickel-cobalt-manganese composite oxide particle as a raw material, a production process therefor, and a non-aqueous electrolyte secondary battery that uses the positive electrode active material as a positive electrode material. It is to be noted that the present application claims priority based on the Japanese Patent Application No. 2014-157102 filed on Jul. 31, 2014 in Japan.

Description of Related Art

In recent years, along with the popularization of mobile electronic devices such as cellular phones and lap-top personal computers, the development of small and light non-aqueous electrolyte secondary batteries with a high energy density has been desired strongly. In addition, as batteries for electric vehicles including hybrid vehicles, the development of high-output secondary batteries has been desired strongly.

There are lithium ion secondary batteries as secondary batteries that meet these requirements. The lithium ion secondary batteries are each composed of a negative electrode and a positive electrode, and an electrolytic solution or the like, and materials capable of desorbing and inserting lithium are used as active materials for the negative electrode and the positive electrode.

Lithium ion secondary batteries have been actively researched and developed now, and above all, lithium ion secondary batteries that use layered or spinel-type lithium metal composite oxides for positive electrode materials achieve high voltages on the order of 4 V, which have been thus progressively put into practical use as batteries with a high energy density.

As positive electrode materials for lithium ion secondary batteries, currently, composite oxides have been proposed, such as lithium-cobalt composite oxides ($LiCoO_2$) which are relatively easily synthesized, lithium-nickel composite oxides ($LiNiO_2$) and lithium-nickel-cobalt-manganese composite oxides ($LiNi_{1/3}Co_{1/3}Mn_{1/3}O_2$) which use more inexpensive nickel than cobalt, lithium-manganese composite oxides ($LiMn_2O_4$) which use manganese, and lithium-nickel-manganese composite oxides ($LiNi_{0.5}Mn_{0.5}O_2$).

Among the positive electrode materials, in recent years, lithium-nickel-cobalt-manganese composite oxides ($LiNi_{0.33}Co_{0.33}Mn_{0.33}O_2$) have been attracting attention, which are excellent in thermal stability and high in capacity. The lithium-nickel-cobalt-manganese composite oxides ($LiNi_{0.33}Co_{0.33}Mn_{0.33}O_2$) have layered compounds as with the lithium-cobalt composite oxides and the lithium-nickel composite oxides, and contain, at the transition metal site, nickel, cobalt, and manganese in proportions basically at a composition ratio of 1:1:1.

Now, as conditions of allowing a positive electrode to achieve excellent performance (high cycle characteristics, low resistance, high output), the positive electrode material is required to be composed of particles with a uniform and appropriate particle size, and further required to be produced so as to be dispersed uniformly in the electrode.

This is due to the fact that the use of a material that is large in particle size and small in specific surface area fails to ensure a sufficient area for a reaction with an electrolytic solution, thereby increasing the reaction resistance, and thus failing to achieve a high-output battery. In addition, the use of a material that has a broad particle size distribution results in unevenness of the voltage applied to particles in the electrode, and thus, repeated charge and discharge selectively degrade microparticles, thereby decreasing the capacity. Furthermore, when the dispersed state is not uniform, the flow of current is biased, thereby causing problems such as a decrease in battery capacity and an increase in reaction resistance.

As a positive electrode active material that is highly uniform in particle size and small in particle size, Patent Document 1 discloses a positive electrode active material of a lithium-nickel-cobalt-manganese composite oxide composed of a hexagonal lithium-containing composite oxide that has a layered structure, where the positive electrode active material is 2 to 8 μm in average particle size, and 0.60 or less in [(d90−d10)/average particle size] as an index indicating the breadth of a particle size distribution. This positive electrode active material is supposedly capable of achieving great battery output characteristics and high capacities, but the dispersibility in electrodes is not considered.

Causes of biased dispersibility in the electrode include, for example, the influence of the alkalinity of the positive electrode active material. It is known that when the alkalinity of the positive electrode active material is high, the alkali attacks and polymerizes a binder (PVDF) commonly used in the adjustment of a positive electrode paste, thereby causing the positive electrode paste to gelate, and thus failing to apply the paste evenly. The reduction in the alkalinity of the positive electrode active material is conceivable as a process for preventing the situation.

As a positive electrode active material with alkalinity reduced, the positive electrode active material with the Mn/Ni ratio controlled therein has been proposed. For example, Patent Document 2 discloses a positive electrode active material of a lithium-nickel-cobalt-manganese composite oxide composed of a hexagonal lithium-containing composite oxide that has a layered structure, where the positive electrode active material is 3 to 12 μm in average particle size, 0.60 or less in [(d90−d10)/average particle size] as an index indicating the breadth of a particle size distribution, and pH=10.6 to 11.5 in alkalinity, and a process for producing the positive electrode active material.

Patent Document 1: JP 2011-116580 A
Patent Document 2: JP 2012-256435 A

However, in accordance with the production process described in Patent Document 2, the Mn/Ni ratio in an aqueous solution for use at the stage of the formation of outer peripheral parts of secondary particles is made higher than that in an aqueous solution at the stage of the formation of inner parts thereof in the production of nickel-manganese composite hydroxide particles as a precursor for the positive electrode active material. Further, because the aqueous solutions are switched in the process of the crystallization reaction, productivity is decreased in the production on an industrial scale, and uniformity between the particles is less likely to be achieved therein. Moreover, the increased ratio of Mn/Ni in the outer peripheries of the secondary particles of the lithium-manganese-nickel composite oxide has the problem of difficulty in achieving high outputs.

As mentioned above, there is no example of a report that the alkalinity of the positive electrode active material is reduced while the output is increased satisfactorily. In addition, currently, on an industrial scale, lithium-nickel-cobalt-manganese composite oxides that can sufficiently improve the performance of non-aqueous electrolyte secondary batteries have not been developed, but the development has been desired.

SUMMARY OF THE INVENTION

In view of the problems mentioned above, an object of the present invention is to provide a positive electrode active material for a non-aqueous electrolyte secondary battery, which can reduce the alkalinity, thereby suppressing gelation in the preparation of a positive electrode active material paste, and thus improves the dispersibility of the positive electrode active material, thereby making it possible to increase the output and capacity of a battery.

In addition, an object of the present invention to provide a process for producing a positive electrode active material for a non-aqueous electrolyte secondary battery which has such excellent characteristics.

Furthermore, an object of the present invention is to provide a high-capacity and high-output non-aqueous electrolyte secondary battery that uses such positive electrode active material.

In order to solve the problems mentioned above, the inventors have earnestly studied the suppression of gelation in the formation of pastes from positive electrode active materials for non-aqueous electrolyte secondary batteries, and found that gelation is affected by the concentration distributions of manganese in secondary particles and primary particles constituting positive electrode active material particles. Furthermore, the inventors have found that it is possible to control the concentration distributions of manganese in the secondary particles and primary particles, depending on conditions in the calcination of raw materials mixed with lithium compounds (lithium mixtures), thereby achieving the present invention.

More specifically, the positive electrode active material for a non-aqueous electrolyte secondary battery according to the present invention is a positive electrode active material for a non-aqueous electrolyte secondary battery, which is composed of hexagonal lithium-nickel-cobalt-manganese composite oxide particles represented by the general formula: $Li_{1+s}Ni_xCo_yMn_zM_tO_2$ (s, x, y, z, and t in the formula fall within the ranges of: $-0.05 \leq s \leq 0.20$; $0.1 \leq x \leq 0.7$; $0.1 \leq y \leq 0.5$; $0.1 \leq z \leq 0.5$; and $0 \leq t \leq 0.05$, and x, y, z, and t meet $x+y+z+t=1$, and M in the formula represents one or more additive elements selected from Ca, Mg, Al, Ti, V, Cr, Zr, Nb, Mo, Hf, Ta, and W), and having a layered structure composed of secondary particles with aggregated primary particles, characterized in that the secondary particles are each composed of an outer-shell part that has a high manganese concentration and a central part that has a low manganese concentration lower than the manganese concentration of the outer-shell part, the primary particles constituting the outer-shell parts of the secondary particles, which have the high manganese concentration, are each composed of an outer peripheral part that has a low manganese concentration and an inner part that has a high manganese concentration, and the ratio of the manganese concentration in the inner part of the primary particle to the manganese concentration in the outer peripheral part of the primary particle is 1.5 to 2.5.

In the positive electrode active material for a non-aqueous electrolyte secondary battery according to the present invention, the ratio of the manganese concentration in the central part of the secondary particle to the manganese concentration in the outer-shell part of the secondary particle is desirably 0.3 to 0.7.

The positive electrode active material for a non-aqueous electrolyte secondary battery according to the present invention is desirably 3 µm to 20 µm in average particle size.

In the positive electrode active material for a non-aqueous electrolyte secondary battery according to the present invention, the primary particles are desirably 0.2 µm to 0.5 µm in average particle size.

The positive electrode active material for a non-aqueous electrolyte secondary battery according to the present invention is desirably 0.60 or less in [(d90−d10)/average particle size] as an index indicating the breadth of a particle size distribution.

In the positive electrode active material for a non-aqueous electrolyte secondary battery according to the present invention, the secondary particles desirably have voids in central parts of the secondary particles.

The process for producing a positive electrode active material for a non-aqueous electrolyte secondary battery according to the present invention is a process for producing a positive electrode active material for a non-aqueous electrolyte secondary battery, which is obtained with the use of nickel-cobalt-manganese composite hydroxide particles represented by the general formula: $Ni_xCo_yMn_zM_t(OH)_{2+\alpha}$ (x, y, z, and t in the formula fall within the ranges of: $0.1 \leq x \leq 0.7$; $0.1 \leq y \leq 0.5$; $0.1 \leq z \leq 0.5$; and $0 \leq t \leq 0.05$, and x, y, z, and t meet $x+y+z+t=1$, and M in the formula represents at least one or more additive elements selected from Ca, Mg, Al, Ti, V, Cr, Zr, Nb, Mo, Hf, Ta, and W), characterized in that the process includes: a crystallization step of obtaining the nickel-cobalt-manganese composite hydroxide particles; a mixing step of mixing the nickel-cobalt-manganese composite hydroxide particles with a lithium compound such that the ratio of the atom number of lithium will be 0.95 to 1.20 with respect to the total of the atom numbers of the metal elements other than lithium, thereby providing a lithium mixture; and a calcining step of, in an oxidizing atmosphere, elevating the temperature from room temperature to 400° C. to 550° C. over 0.5 hours to 1.5 hours and keeping the elevated temperature for 1 hour to 5 hours, and further elevating the temperature to 850° C. to 950° C. over 0.5 hours to 1.0 hour and keeping the elevated temperature for 1 hour to 5 hours, thereby providing a lithium-nickel-cobalt-manganese composite oxide particles.

The process for producing the positive electrode active material for a non-aqueous electrolyte secondary battery according to the present invention desirably further includes, before the mixing step, a heat treatment step of applying a heat treatment at 105° C. to 150° C. to the nickel-cobalt-manganese composite hydroxide particles.

The process for producing the positive electrode active material for a non-aqueous electrolyte secondary battery according to the present invention desirably further includes a grinding step of grinding the lithium-nickel-cobalt-manganese composite oxide particles obtained in the calcining step.

A non-aqueous electrolyte secondary battery according to the present invention comprising a positive electrode, a negative electrode, a separator, and a non-aqueous electrolyte, wherein the above-mentioned positive electrode active material for a non-aqueous electrolyte secondary battery is used for the positive electrode.

The positive electrode active material for a non-aqueous electrolyte secondary battery according to the present invention can suppress an increase in pH indicating alkalinity, and suppress gelation in the formation of a paste, thereby making it possible to improve the dispersibility.

The process for producing a positive electrode active material for a non-aqueous electrolyte secondary battery according to the present invention can achieve a positive electrode active material which has excellent characteristics as described above.

The secondary battery that uses the positive electrode active material for a non-aqueous electrolyte secondary battery according to the present invention has excellent electrical characteristics of high output with a high capacity.

DETAILED DESCRIPTION OF THE INVENTION

Figure 1:
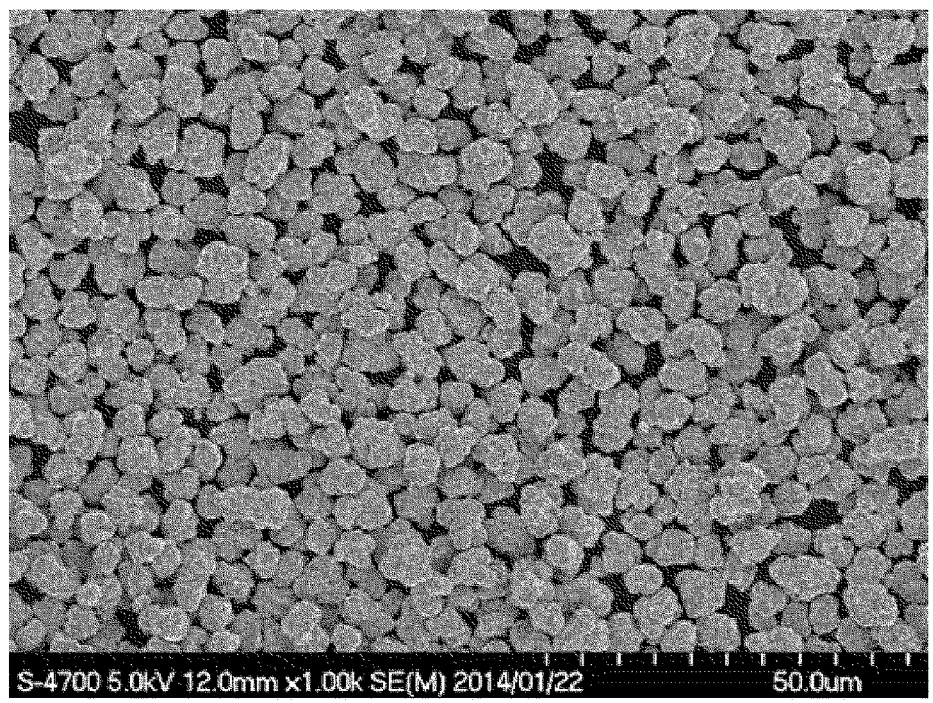
FIG. 1 is a FE-SEM photograph (observes at 1,000-fold magnification) of a positive electrode active material obtained in Example 1.

Specific embodiments (hereinafter, referred to as "the present embodiments") suitable in accordance with the present invention will be described in detail below with respect to the following items. It is to be noted that the present invention is not to be considered limited to the following embodiments, but appropriate changes can be made as long as the scope of the present invention is not changed.

1. Positive Electrode Active Material for Non-Aqueous Electrolyte Secondary Battery
2. Process for Producing Positive Electrode Active Material for Non-Aqueous Electrolyte Secondary Battery
3 Non-aqueous Electrolyte Secondary Battery 1. Positive Electrode Active Material for Non-Aqueous Electrolyte Secondary Battery (Composition)

The positive electrode active material for a non-aqueous electrolyte secondary battery according to the present embodiment (hereinafter, referred to as "positive electrode active material") is composed of hexagonal lithium-nickel-cobalt-manganese composite oxide particles represented by the general formula: $Li_{1+s}Ni_xCo_yMn_zM_tO_2$ (s, x, y, z, and t in the formula fall within the ranges of: $-0.05 \leq s \leq 0.20$; $0.1 \leq x \leq 0.7$; $0.1 \leq y \leq 0.5$; $0.1 \leq z \leq 0.5$; and $0 \leq t \leq 0.05$, and x, y, z, and t meet $x+y+z+t=1$, and M in the formula represents one or more additive elements selected from Ca, Mg, Al, Ti, V, Cr, Zr, Nb, Mo, Hf, Ta, and W), the particles having a layered structure composed of secondary particles with aggregated primary particles.

In the positive electrode active material, the value of s indicating the excessive amount of lithium is adapted to meet $-0.05 \leq s \leq 0.20$. When the excessive amount s of lithium is less than $-0.05$, the reaction resistance of a positive electrode will be increased in a non-aqueous electrolyte secondary battery that uses the positive electrode active material obtained, thereby decreasing the output of the battery. On the other hand, when the excessive amount s of lithium exceeds 0.20, the discharge capacity will be decreased in the case of using the positive electrode active material for a positive electrode of a battery, and the reaction resistance of the positive electrode will be also increased. The s indicating the excessive amount of lithium is preferably adjusted to 0.10 or more, from the perspective of further reducing the reaction resistance.

In addition, nickel, cobalt, and manganese constitute, along with lithium, the basic skeleton of the hexagonal lithium-cobalt-manganese composite oxide particle that has the layered structure. The atomic ratios x, y, and z of nickel, cobalt, and manganese, which indicate the contents thereof, are adapted to meet $0.1 \leq x \leq 0.7$, $0.1 \leq y \leq 0.5$, and $0.1 \leq z \leq 0.5$. These are determined in consideration of electrical characteristics, thermal stability, and the like.

Further, the positive electrode active material contains the additive elements, and thus improve durability and output characteristics of a battery in the case of use as a positive electrode active material for the battery. In particular, as long as the additive elements are adjusted so as to be homogeneously distributed on the surfaces of or in the lithium-nickel-cobalt-manganese composite oxide particles, the whole composite oxide particles can achieve the durability and output characteristics of the battery, and thus having the advantage that the addition of the small amounts can achieve the effects, and can keep the capacity from being decreased.

t indicating the content of the additive elements is adapted to meet $0 \leq t \leq 0.05$, preferably $0.0003 \leq t \leq 0.05$. When the content of the additive elements exceeds 0.05, the battery capacity is decreased because of the decreased amount of a metal element that contributes to a Redox reaction. The content of the additive amount is adapted to meet $0.0003 \leq t \leq 0.05$, thereby making it possible to achieve the effect of improving battery characteristics with the additive elements while keeping the battery capacity from being decreased.

(Configuration)

In addition, the positive electrode active material is composed of secondary particles with aggregated primary particles.

(Primary Particle)

The primary particles are composed of an outer peripheral part that has a low manganese concentration and an inner part that has a high manganese concentration, and adapted to have a gradient composition. The ratio of the manganese concentration in the inner part to the manganese concentration in the outer peripheral part is adapted to 1.5 to 2.5 in the primary particle. Thus, in the positive electrode active material, because there is a small amounts of manganese that increases the reaction resistance on the primary particle surface, the increase in reaction resistance is suppressed and makes it possible to reduce the alkalinity when used as a positive electrode active material for a secondary battery, and the suppression of gelation in the preparation of a paste improves the dispersibility. As a result of using such an excellent positive electrode active material, a high-output secondary battery can be achieved.

When the ratio of the manganese concentration in the inner part to the manganese concentration in the outer peripheral part is less than 1.5 in the primary particles, the manganese concentration in the peripheral part will be increased, thus thereby increasing the resistance of a positive electrode in use for a battery. On the other hand, when the ratio of the manganese concentration in the inner part to that in the outer peripheral part exceeds 2.5, the manganese concentration in the peripheral part will be decreased in the primary particles, the alkalinity of the positive electrode active material will be thus increased, and gelation in the preparation of a paste will result in poor dispersibility.

The primary particles are preferably 0.2 µm to 0.5 µm in average particle size. This size allows the positive electrode active material to balance great battery characteristics through the suppression of gelation in the formation of a paste. The average particle size for the primary particles can be measured by cross-sectional observation with a scanning electron microscope.

(Secondary Particle)

The secondary particles are composed of an outer-shell part that has a high manganese concentration, and a central part that has a low manganese concentration lower than the manganese concentration of the outer-shell part, and adapted to have a gradient composition as with the primary particles. More specifically, increasing the manganese concentration in the outer-shell parts of the secondary particles makes it possible to keep the pH indicating the alkalinity of the positive electrode active material from being increased.

It is possible to evaluate the alkalinity of the positive electrode active material as the pH of a mixture of the positive electrode active material with water, specifically as the pH value measured when 2 g of the positive electrode active material is put in 100 cc of water at 25° C., stirred for 1 minute, and then left still for 5 minutes.

On the other hand, simply increasing the manganese concentration in the outer-shell part of the secondary particle increases the resistance of a positive electrode in the case of use for a secondary battery, thus resulting in degradation of battery characteristics such as battery capacity and output characteristics.

Therefore, the increased manganese concentration in the entire outer-shell parts of the secondary particles and the increased manganese concentration in the inner parts with respect to the manganese concentration in the outer peripheral parts of the primary particles constituting the outer-shell parts can increase the manganese concentration in the entire outer-shell parts of the secondary particles, without increasing the manganese concentration in the peripheral parts of the primary particles in contact with an electrolytic solution of the battery. As a result, it becomes possible to reduce the alkalinity of the positive electrode active material, and thus gelation can be prevented in the preparation of a paste.

In addition, the ratio of the manganese concentration in the central part to that in the outer-shell part is preferably 0.3 to 0.7 in the secondary particles. This ratio can keep the alkalinity of the positive electrode active material from being increased, and achieve greater battery characteristics.

When the ratio of the manganese concentration in the central part to the manganese concentration in the outer-shell part is less than 0.3 in the secondary particles, the manganese concentration in the outer-shell parts of the secondary particles may be excessively increased, thereby failing to achieve adequate battery characteristics even when manganese concentration is reduced in the outer peripheral parts of the primary particles. On the other hand, when the ratio of the manganese concentration in the central part to the manganese concentration in the outer-shell part exceeds 0.7 in the secondary particles, the alkalinity of the positive electrode active material may be increased, thereby failing to adequately suppress gelation in the preparation of a paste.

The secondary particles preferably have voids in the central parts. The positive electrode active material, with the voids, increases the area of contact with an electrolytic solution, thereby making it possible to further enhance the battery characteristics.

(Average Particle Size)

The positive electrode active material is preferably 3 µm to 20 µm in average particle size. The average particle size of 3 µm to 20 µm can make battery characteristics further favorable in the case of use for a battery.

When the positive electrode active material is less than 3 µm in average particle size, the filling property in the positive electrode may be degraded, thereby failing to adequately achieve the battery capacity per unit volume of battery. On the other hand, the average particle size in excess of 20 µm may result in failure to achieve the reduction in the layer thickness of the electrode for increasing the output.

(Particle Size Distribution)

The positive electrode active material is preferably 0.60 or less, more preferably 0.50 or less in [(d90−d10)/average particle size] as an index indicating the breadth of a particle size distribution. The [(d90−d10)/average particle size] of 0.60 or less can uniformize how a voltage is applied between particles in charge-discharge, and achieve greater battery characteristics.

In this regard, an average particle size MV is on a volumetric basis used for the average particle size of the positive electrode active material. In addition, in the index [(d90−d10)/average particle size] indicating the breadth of the particle size distribution, d10 means a particle size at which the accumulated volume accounts for 10% of the total volume of all particles when the number of particles at each particle size is accumulated in order of increasing the particle size. In addition, d90 means a particle size at which the accumulated volume accounts for 90% of the total volume of all particles when the number of particles is accumulated in the same way. The process for obtaining the average particle size, d90, and d10 are not particularly limited, but the average particle size, d90, and d10 can be obtained, for example, from volumetric integration values measured with a laser light diffraction-scattering-type particle size analyzer.

In the foregoing positive electrode active material, the secondary particle are composed of the outer-shell parts with a high manganese concentration and the central parts with a low manganese concentration lower than the manganese concentration of the outer-shell parts, the primary particles constituting the outer-shell parts of the secondary particles with the high manganese concentration are composed of the outer peripheral parts with a low manganese concentration and the inner parts with a high manganese concentration, and the ratio of the manganese concentration in the inner part to the manganese concentration in the peripheral part is 1.5 to 2.5 in the primary particles.

Accordingly, the positive electrode active material can increase the manganese concentration as the whole outer-shell part of the secondary particle to reduce the alkalinity of the positive electrode active material, thereby preventing gelation in the preparation of a paste, and thus increasing the dispersibility.

Furthermore, the use of the positive electrode active material as a positive electrode material can achieve a non-aqueous electrolyte secondary battery which has great battery characteristics and battery capacity.

2. Process for Producing Positive Electrode Active Material for Non-Aqueous Electrolyte Secondary Battery A process for producing a positive electrode active material for a non-aqueous electrolyte secondary battery (hereinafter, referred to as a "production process") includes: a crystallization step of obtaining nickel-cobalt-manganese composite hydroxide particles; a heat treatment step of applying a heat treatment to the obtained nickel-cobalt-manganese composite hydroxide particles; a mixing step of mixing the nickel-cobalt-manganese composite hydroxide particles with a lithium compound, thereby providing a lithium mixture; a calcining step of calcining the obtained lithium mixture in an oxidizing atmosphere, thereby providing nickel-cobalt-manganese composite oxide particles; and a grinding step of grinding the obtained lithium-nickel-cobalt-manganese composite oxide particles, and the positive electrode active material for a non-aqueous electrolyte secondary battery is obtained through the respective steps. The respective steps will be each described in detail below.

(1) Crystallization Step

The crystallization step can generate crystal nuclei including various types of metals (hereinafter, referred to as a "nucleation stage"), and cause the crystal nuclei obtained in the nucleation stage to grow to particles (hereinafter, referred to as a "particle growth stage"), thereby producing nickel-cobalt-manganese composite hydroxide particles.

(Nucleation Stage)

The nucleation stage is intended to obtain crystal nuclei through the adjustment of pH from an aqueous solution for nucleation, including at least respective metal compounds containing nickel, cobalt, and manganese.

First, in the nucleation stage, the respective metal compounds containing nickel, cobalt, and manganese are dissolved in water in predetermined proportions, thereby preparing a mixed aqueous solution. In the crystallization step, the composition ratios of the respective metals in composite hydroxide particles obtained are equivalent to the composition ratios of the respective metals in the mixed aqueous solution.

Therefore, the mixed aqueous solution is prepared by adjusting the proportions of the metal compounds dissolved in water such that the composition ratios of the respective metals in the mixed aqueous solution are equal to the composition ratios of respective metals in nickel-cobalt-manganese composite hydroxide particles.

On the other hand, an alkaline aqueous solution such as an aqueous solution of sodium hydroxide, an ammonia aqueous solution including an ammonium ion supplier, and water are supplied to a reaction tank, and mixed to form an aqueous solution. For this aqueous solution (hereinafter, referred to as "pre-reaction aqueous solution"), the pH value is adjusted so as to be 12.0 or more on the basis of a liquid temperature of 25° C., by adjusting the amount of the alkaline aqueous solution supplied. The concentration of ammonium ions in the pre-reaction aqueous solution is adjusted to be preferably 3 g/L to 15 g/L, by adjusting the amount of the ammonia aqueous solution supplied. It is possible to measure the pH value and ammonium ion concentration of the aqueous solution in the reaction tank respectively with common pH meter and ion meter.

The temperature of the pre-reaction aqueous solution is adjusted so as to be preferably 35° C. to 60° C.

The mixed aqueous solution is supplied into the reaction tank while adjusting the temperature and pH of the pre-reaction aqueous solution in the reaction tank, and while stirring the pre-reaction aqueous solution. In the reaction tank, the pre-reaction aqueous solution and the mixed aqueous solution are mixed, thereby forming an aqueous solution for nucleation as a reaction aqueous solution in the nucleation stage. Thus, fine nuclei for nickel-cobalt-manganese composite hydroxide particles are generated in the aqueous solution for nucleation. In this regard, the pH value of the aqueous solution for nucleation falls within the range mentioned above, and thus nucleation proceeds on a preferential basis, almost without growth of the nuclei generated.

The supply of the mixed aqueous solution, alkaline aqueous solution, and ammonia aqueous solution to the aqueous solution for nucleation causes the generation of new nuclei to continue in the aqueous solution for nucleation. Then, when predetermined amounts of nuclei are generated in the aqueous solution for nucleation, the nucleation stage is ended. Whether predetermined amounts of nuclei are generated or not is determined by the amounts of metal salts added to the aqueous solution for nucleation.

The ammonium ion supplier is not particularly limited, but for example, ammonia, ammonium sulfate, ammonium chloride, ammonium carbonate, ammonium fluoride, and the like can be used.

(Reaction Atmosphere)

In addition, in the nucleation stage, the reaction tank is preferably controlled to an oxidizing atmosphere.

(Metal Compound)

Compounds containing the intended metals are used as the metal compounds. It is preferable to use water-soluble compounds for the compounds used, and examples of the water-soluble compounds include metal salts such as nitrates, sulfates, and hydrochlorides. For example, manganese sulfate, nickel sulfate, and cobalt sulfate are used.

In addition, it is preferable to use a water-soluble compound for the additive element (at least one additive element selected from V, Mg, Al, Ti, Mo, Nb, Zr, and W), and for example, vanadium sulfate, ammonium vanadate, magnesium sulfate, aluminum sulfate, titanium sulfate, ammonium peroxotitanate, potassium titanium oxalate, ammonium molybdate, niobium oxalate, zirconium sulfate, zirconium nitrate, sodium tungstate, ammonium tungstate, and the like can be used.

(Particle Growth Stage)

The particle growth stage is intended to cause the crystal nuclei formed in the nucleation stage to grow through pH adjustment of an aqueous solution for nucleation, thereby producing nickel-cobalt-manganese composite hydroxide particles.

In the particle growth stage, after the completion of the nucleation stage, the pH value of the aqueous solution for nucleation is adjusted so as to be 10.5 to 12.0 on the basis of a liquid temperature of 25° C., and lower than the pH value in the nucleation stage, thereby providing an aqueous solution for particle growth as a reaction aqueous solution in the particle growth stage. Specifically, the pH is controlled in the adjustment by adjusting the amount of the alkaline aqueous solution supplied.

The temperature of the aqueous solution for particle growth is adjusted so as to be preferably 35° C. to 60° C.

The pH value of the aqueous solution for particle growth in the range mentioned above causes the particle growth reaction to proceed on a preferential basis, rather than the nucleation reaction. Thus, in the particle growth stage, the particle growth proceeds almost without generation of new nuclei in the aqueous solution for particle growth, thereby forming nickel-cobalt-manganese composite hydroxide particles having predetermined particle sizes.

Likewise, the pH value and ammonium ion concentration of the aqueous solution for particle growth vary with the particle growth through the supply of the mixed aqueous solution. Also to the aqueous solution for particle growth, an alkaline aqueous solution and an ammonia aqueous solution are supplied along with the mixed aqueous solution, thereby controlling the ammonium ion concentration so as to keep the concentration within the range of 3 g/L to 15 g/L.

In the particle growth stage, after the nucleation stage or in the process of the particle growth stage, it is preferable to cause the particle growth to proceed subsequently after increasing the composite hydroxide particle concentration in the reaction tank by discharging some of the post-reaction solution to the outside of the reaction tank.

(Reaction Atmosphere)

In addition, in the particle growth stage, it is preferable to develop the reaction in the crystallization step while the oxygen concentration in the space in the reaction tank is controlled to 5% or less.

It is to be noted that the ammonium ion supplier, metal compounds, and additive elements in the particle growth stage are the same as in the nucleation stage described previously.

In the particle growth stage, when the nickel-cobalt-manganese composite hydroxide particles grow to a predetermined particle size, the particle growth stage is ended.

The obtained nickel-cobalt-manganese composite hydroxide particles (hereinafter, referred to as "composite hydroxide particles") are represented by the general formula: $Ni_xCo_yMn_zM_t(OH)_{2+\alpha}$ (x, y, z, and t in the formula fall within the ranges of: $0.1 \le x \le 0.7$; $0.1 \le y \le 0.5$; $0.1 \le z \le 0.5$; and $0 \le t \le 0.05$, and x, y, z, and t meet $x+y+z+t=1$, and M in the formula represents at least one or more additive elements selected from Ca, Mg, Al, Ti, V, Cr, Zr, Nb, Mo, Hf, Ta, and W).

In order to further improve battery characteristics, it is preferable to use composite hydroxide particles made uniform in particle size. It is possible to obtain such composite hydroxide particles easily in accordance with a crystallization process separated into a nucleation stage and a particle growth stage, as with the nickel-cobalt-manganese composite hydroxide particles according to the present embodiment, and for example, the known process disclosed in Japanese Patent 5316726 can be used.

Thus, in the crystallization step, nickel-cobalt-manganese composite hydroxide particles can be produced which are characterized in that the particles are 3 µm to 7 µm in average particle size, 0.55 or less in [(d90−d10)/average particle size] as an index indicating the breadth of a particle size distribution, and narrow in particle size distribution, and monodisperse.

(2) Heat Treatment Step

The heat treatment step is a step of applying a heat treatment at a predetermined temperature to the nickel-cobalt-manganese composite hydroxide particles obtained in the crystallization step. The heat treatment can remove excess water in the composite hydroxide, thereby stabilizing the ratio of the lithium atom number to the total of the atom numbers of the metal elements other than lithium in the positive electrode active material, and thus stabilizing battery characteristics. In accordance with this step, composite hydroxide particles with water vaporized therefrom can be obtained.

In the heat treatment step, the composite hydroxide particles obtained in the crystallization step is subjected to a heat treatment at 105° C. to 150° C. The heat treatment step at lower than 105° C. is not appropriate industrially, because the heat treatment requires a period of time. On the other hand, when the heat treatment step applies the heat treatment in excess of 150° C., thereby excessively increasing the crystallinity of the composite hydroxide particles, the calcining step as a subsequent step even may fail to provide composite hydroxide particles with the ratio of manganese concentration as described above.

In addition, the atmosphere for carrying out the heat treatment is considered not to be particularly limited, but the heat treatment is preferably carried out in an air flow.

The heat treatment step is intended to carry out the heat treatment for the purpose of removing excess water in the composite hydroxide particles, and can be skipped as long as the ratio of the lithium atom number can be stabilized.

The equipment for use in the heat treatment is considered not to be particularly limited, but may be any equipment as long as the equipment can heat the composite hydroxide particles in an air flow, and an electric furnace without gas generation, a blowing dryer, or the like can be used in a preferred manner.

The heat treatment for the composite hydroxide particles is preferably carried out before the mixing step described later. In addition, when the composite hydroxide particles obtained in the crystallization step has a small amount of excess water, the heat treatment is not particularly required.

(3) Mixing Step

The mixing step is a step of mixing the composite hydroxide particles with a lithium compound in predetermined proportions, thereby providing a lithium mixture. More specifically, in mixing the composite hydroxide particles and the lithium compound, the particles and the compound are mixed such that the ratio (Li/Me) of the lithium atom number (Li) to the sum (Me) of the atom numbers of nickel, cobalt, manganese, and the additive element is 0.95 to 1.20, preferably 1.05 to 1.20.

The Li/Me is not changed in the calcining step described later, and the Li/Me of mixing in the mixing step thus corresponds to the Li/Me in the positive electrode active material. Accordingly, in the mixing step, the composite hydroxide particles and the lithium compound are mixed so as to achieve the Li/Me in the positive electrode active material to be obtained.

The lithium compound is considered not to be particularly limited, but for example, lithium hydroxide, lithium nitrate, or lithium carbonate, or mixtures thereof are preferred in terms of being easily available. In particular, in consideration of ease of handling and quality stability, it is more preferable to use lithium hydroxide or lithium carbonate, or a mixture thereof for the lithium compound.

The composite hydroxide particles and the lithium mixture are preferably mixed sufficiently before the calcination. In the case of insufficient mixing, there is a possibility that the Li/Me will vary among individual particles, thereby causing problems such as failure to achieve adequate battery characteristics.

For mixing the composite hydroxide particles and the lithium compound, common mixing machines can be used, and for example, shaker mixers, Loedige mixers, Julia mixers, and V blenders can be used. In the mixing step, the composite hydroxide particles and the lithium compound may be mixed sufficiently to the extent that the heat-treated particles or the like are not broken in shape.

(4) Calcining Step

The calcining step is a step of obtaining lithium-nickel-cobalt-manganese composite oxide particles through a first calcining stage of the lithium mixture obtained in the mixing step for increasing the manganese concentration in the outer-shell parts of the secondary particle, thereby forming a phase with an increased manganese concentration; and a second calcining stage for reacting nickel and cobalt with the lithium mixture while maintaining the phase with the increased manganese concentration in the outer-shell parts of the secondary particles under a predetermined condition.

(First Calcining Stage)

In the first calcining stage, the temperature of the lithium mixture obtained in the mixing step is elevated from room temperature to 400° C. to 550° C. over 0.5 hours to 1.5 hours in an oxidizing atmosphere, and the elevated temperature is kept for 1 hour to 5 hours.

The calcination temperature for the first calcining stage is kept at 400° C. to 550° C., preferably 450° C. to 550° C., thereby causing the manganese included in the composite oxide particles to react with the lithium mixture on a preferential basis, and thus producing a phase with an increased manganese concentration in the outer-shell parts of the secondary particles.

When the calcination temperature for the first calcining stage is lower than 400° C., the reaction between the manganese and the lithium mixture will proceed insufficiently. On the other hand, when the calcination temperature for the first calcining stage exceeds 550° C., not only the manganese but also nickel and cobalt will react with the lithium mixture, thus failing to increase the manganese concentration in the outer-shell parts of the secondary particles.

The calcination time for the first calcining stage, that is, the holding time at 400° C. to 550° C. is 1 hour to 5 hours, preferably 1 hour to 3 hours. When the calcination time for the first calcining stage is shorter than 1 hour, the manganese and the lithium will react insufficiently, thus decreasing the ratio of the manganese concentration in the inner part of the primary particle to the manganese concentration in the outer peripheral part thereof. On the other hand, when the calcination time for the first calcining stage exceeds 5 hours, nickel and cobalt, besides the manganese, will also react with the lithium mixture, thus decreasing the concentration ratio of manganese in the secondary particles.

In the first calcining stage, the temperature is elevated from room temperature to 400° C. to 550° C. over 0.5 hours to 1.5 hours. When the time of elevating the temperature for the first calcining stage is shorter than 0.5 hours, the heterogeneous reaction with lithium will decrease battery characteristics. On the other hand, when the time of elevating the temperature for the first calcining stage exceeds 1.5 hours, the concentration ratio of manganese in the secondary particles will be decreased.

(Second Calcining Stage)

In the second calcining stage, after the first calcining stage, the temperature of the lithium mixture obtained in the first calcining stage is elevated from the calcination temperature for the first calcining stage to 850° C. to 950° C. over 0.5 hours to 1.0 hour in an oxidizing atmosphere, and the elevated temperature is kept for 1 hour to 5 hours.

The calcination temperature for the second calcining stage is kept at 850° C. to 950° C., preferably 875° C. to 925° C., thereby causing nickel and cobalt to react also with the lithium mixture while maintaining a phase with an increased manganese concentration in the outer-shell parts of the secondary particles. In addition, the reaction of nickel and cobalt with the lithium mixture proceeds in the outer peripheral parts of the primary particles, thus leaving a phase with an increased manganese concentration in the inner parts of the primary particles.

When the calcination temperature for the second calcining stage is lower than 850° C., lithium will diffuse insufficiently into the lithium-nickel-cobalt-manganese composite oxide particles, and battery characteristics will be degraded with the excess lithium and unreacted composite oxide left or the crystal structure adjusted insufficiently. On the other hand, when the calcination temperature for the second calcining stage exceeds 950° C., the uniform concentration ratio of manganese, and severe sintering and abnormal particle growth between the lithium-nickel-cobalt-manganese composite oxide particles will make the particles coarse, thereby degrading battery characteristics such as output characteristics.

The calcination time for the second calcining stage, that is, the holding time at 850° C. to 950° C. is 1 hour to 5 hours, preferably 1 hour to 4 hours. When the calcination time for the second calcining stage is shorter than 1 hour, insufficiently adjusted crystallinity of the lithium-nickel-cobalt-manganese composite oxide will degrade battery characteristics. On the other hand, when the calcination time for the second calcining stage exceeds 5 hours, the manganese concentration will become uniform in the primary particles that form the outer-shell parts of the secondary particles.

In the second calcining stage, the temperature is elevated from the calcination temperature for the first calcining stage to 850° C. to 950° C. over 0.5 hours to 1.0 hour. When the time of elevating the temperature for the second calcining stage is lower than 0.5 hours, the insufficient solid-phase reaction between the lithium mixture and the composite hydroxide will make the particles sintered with each other, thereby failing to achieve a uniform particle size. On the other hand, when the time of elevating the temperature for the second calcining stage exceeds 1 hour, the manganese will diffuse, thereby excessively decreasing the ratio of the manganese concentration in the central parts of the secondary particles to the manganese concentration in the outer-shell parts thereof.

(Atmosphere for Calcination)

The atmospheres for the calcination in the first calcining stage and the second calcining stage are adjusted to oxidizing atmospheres, preferably atmospheres with an oxygen concentration of 18 volume % to 100 volume %. More specifically, the calcination is preferably carried out in the air atmosphere to an oxygen flow. In consideration of cost, calcination in an air flow is particularly preferred. When the oxygen concentration is lower than 18 volume %, insufficient oxidation may result in insufficient crystallinity of the lithium-nickel-cobalt-manganese composite oxide.

The furnace for use in the calcination is considered not to be particularly limited, as long as the furnace can heat the lithium mixture in the air atmosphere or an oxygen flow. For example, from the perspective of keeping the atmosphere in the furnace homogeneous, an electric furnace without gas generation is preferred, and any batch or continuous furnace can be used.

In accordance with the calcining step, lithium-nickel-cobalt composite oxide particles can be produced where the concentration ratio of manganese is low between the outer-shell part and central part of the secondary particle, and the ratio of the manganese concentration in the inner parts of the primary particles constituting the outer-shell part of the secondary particle is 1.5 to 2.5 to the manganese concentration in the outer peripheral parts thereof.

(5) Grinding Step

The grinding step is a step of grinding the lithium-nickel-cobalt-manganese composite oxide particles obtained in accordance with the calcining step. Thus, a lithium-nickel-cobalt-manganese composite oxide, that is, a positive electrode active material according to the present invention can be obtained.

In this regard, the grinding refers to the operation of inputting mechanical energy to aggregates composed of multiple secondary particles produced by sintering necking or the like between secondary particles during the calcination, thereby separating the secondary particles almost without destroying the secondary particles themselves, thus loosening the aggregates.

When the lithium-nickel-cobalt-manganese composite oxide particles obtained in accordance with the calcining step are aggregated, the grinding treatment is preferably carried out after the calcining step. When the lithium-nickel-cobalt-manganese composite oxide particles obtained in accordance with the calcining step are not aggregated, there is no particular need for the grinding treatment.

The process for producing a positive electrode active material as described above can provide the characteristic positive electrode active material as described above, by including: the crystallization of obtaining the nickel-cobalt-manganese composite hydroxide particles; the mixing step of mixing the nickel-cobalt-manganese composite hydroxide particles with the lithium compound such that the ratio of the atom number of lithium is 0.95 to 1.20 with respect to the total of the atom numbers of the metal elements other than lithium, thereby providing the lithium mixture; and the calcining step of, in the oxidizing atmosphere, elevating the temperature from room temperature to 400° C. to 550° C. over 0.5 hours to 1.5 hours and keeping the elevated temperature for 1 hour to 5 hours, and further elevating the temperature to 850° C. to 950° C. over 0.5 hours to 1.0 hour and keeping the elevated temperature for 1 hour to 5 hours, thereby providing the lithium-nickel-cobalt-manganese composite oxide particles.

The process for producing a positive electrode active material can provide a positive electrode active material for a non-aqueous electrolyte secondary battery which has great characteristics as described above. In addition, the process for producing a positive electrode active material has extremely high industrial value, due to the fact that the process is also suitable for production of such a positive electrode active material on an industrial scale.

3. Non-Aqueous Electrolyte Secondary Battery

A non-aqueous electrolyte secondary battery including a positive electrode, a negative electrode, a non-aqueous electrolytic solution, and the like is configured to have the same constituent elements as those of a common non-aqueous electrolyte secondary battery. It is to be noted that the embodiments described below are only for illustration, and based on the embodiments described in this specification, non-aqueous electrolyte secondary battery according to the present invention with various modifications and improvements applied can be achieved on the basis of knowledge of one skilled in the art. In addition, the application of the non-aqueous electrolyte secondary battery according to the present invention is considered not to be particularly limited.

(1) Positive Electrode

The positive electrode of the non-aqueous electrolyte secondary battery is prepared, for example, as follows with the use of a positive electrode active material for a non-aqueous electrolyte secondary battery according to the present embodiment.

First, a powdered positive electrode active material, a conductive material, and a binder are mixed, if necessary, further with the addition of activated carbon and a solvent for the purpose of viscosity control or the like, and kneaded to prepare a positive electrode mixture paste.

In this regard, the mixture ratio of the respective constituents in the positive electrode mixture paste is also important factor for determining the performance of the non-aqueous electrolyte secondary battery. The mixture ratio of the respective constituents in the positive electrode mixture paste is not particularly limited, but for example, when the solid content of the positive electrode mixture excluding the solvent is regarded as 100 parts by mass, as with a positive electrode of a common non-aqueous electrolyte secondary battery, desirably, the content of the positive electrode active material is 60 parts by mass to 95 parts by mass, the content of the conductive material is 1 part by mass to 20 parts by mass, and the content of the binder is 1 part by mass to 20 parts by mass.

The positive electrode mixture paste is, for example, applied to the surface of a current collector made of aluminum foil, and dried to cause the solvent to fly apart. If necessary, the paste may be pressurized by roll press or the like in order to increase the electrode density. In this way, a sheet-like positive electrode can be prepared. The sheet-like positive electrode can be, depending on the intended battery, cut or the like into an appropriate size, and applied to the preparation of the battery. However, the process for preparing the positive electrode is not limited to the foregoing provided as an example, but may be prepared by other processes.

The conductive material is added for providing the electrode with appropriate conductivity. This conductive material is not particularly limited, but for example, carbon black materials can be used such as graphite (e.g., natural graphite, artificial graphite, expanded graphite), acetylene black, and Ketjen black.

The binder serves to bind active material particles together. The binder is not particularly limited, but for example, polyvinylidene fluoride (PVDF), polytetrafluoroethylene (PTFE), fluorine-containing rubbers, ethylene-propylene-diene rubbers, styrene butadiene, cellulose resins, and polyacrylic acid can be used.

If necessary, a solvent that disperses the positive electrode active material, the conductive material, and the activated carbon, and dissolves the binder is added to the positive electrode mixture. Specifically, organic solvents such as N-methyl-2-pyrrolidone can be used as the solvent. Further, activated carbon or the like can be added to the positive electrode mixture in order to increase the electric double layer capacity of the positive electrode.

(2) Negative Electrode

For the negative electrode, an electrode is used which is formed in a way that a paste-like negative electrode mixture obtained by mixing binder into a negative electrode active material that can occlude and desorb metal lithium or a lithium alloy, or lithium ions, and by adding an appropriate solvent thereto, is applied to the surface of a current collector of metal foil such as copper, dried, and if necessary, compressed in order to increase the electrode density.

The negative electrode active material is not particularly limited, but for example, calcined products of organic compounds such as natural graphite, artificial graphite, and phenolic resins, and powdery products of carbonaceous substances such as coke can be used. In this case, as the negative electrode binder, a fluorine-containing resin such as PVDF can be used as with the positive electrode, and an organic solvent such as N-methyl-2-pyrrolidone can be used as a solvent for dispersion of the negative electrode active materials in the binder.

(3) Separator

The separator is disposed to be sandwiched between the positive electrode and the negative electrode, and has the functions of separating the positive electrode and the negative electrode and holding the electrolyte. As the separator, for example, a thin film such as polyethylene and polypropylene, which has a large number of micropores, can be used. It is to be noted that the separator is not particularly limited as long as the separator has the separator functions.

(4) Non-Aqueous Electrolytic Solution

The non-aqueous electrolytic solution is a lithium salt as a supporting salt, dissolved in an organic solvent.

As the organic solvent, one selected from cyclic carbonates such as ethylene carbonate, propylene carbonate, butylene carbonate, and trifluoropropylene carbonate; in addition, chain carbonates such as diethyl carbonate, dimethyl carbonate, ethyl methyl carbonate, and dipropyl carbonate; furthermore, ether compounds such as tetrahydrofuran, 2-methyltetrahydrofuran, and dimethoxyethane; sulfur compounds such as ethyl methyl sulfone and butanesultone; and phosphorous compound such as triethyl phosphate and trioctyl phosphate can be used singly, or two or more thereof can be used in mixture.

As the supporting salt, $LiPF_6$, $LiBF_4$, $LiClO_4$, $LiAsF_6$, $LiN(CF_3SO_2)_2$, composite salts thereof, and the like can be used.

The non-aqueous electrolytic solution may include a radical scavenger, a surfactant, a flame retardant, and the like for the improvement of battery characteristics.

(5) Battery Shape and Configuration

The non-aqueous electrolyte secondary battery composed of the positive electrode, negative electrode, separator, non-aqueous electrolytic solution, and the like described above can be adapted to have various shapes such as cylindrical, rectangular, coin, and button types.

In the case of adopting any shape, the non-aqueous electrolyte secondary battery is formed by stacking the positive electrode and the negative electrode with the separator interposed therebetween, thereby providing an electrode body, impregnating the obtained electrode body with the non-aqueous electrolytic solution, making connections between a positive electrode current collector and a positive electrode terminal leading to the exterior, and between a negative electrode current collector and a negative electrode terminal leading to the exterior, with the use of leads for current collection or the like, and sealing the body in a battery case.

(6) Characteristics

The non-aqueous electrolyte secondary battery achieves, due to the use of the positive electrode active material according to the present embodiment as a positive electrode material, a high initial discharge capacity of 150 mAh/g or more and a low positive electrode resistance of 5Ω or less, thus resulting in a high output with a high capacity. Furthermore, even in comparison with conventional positive electrode active materials of lithium-cobalt based oxides or lithium-nickel based oxides, the thermal stability can be considered high, and the safety can be also considered excellent.

Figure 5:
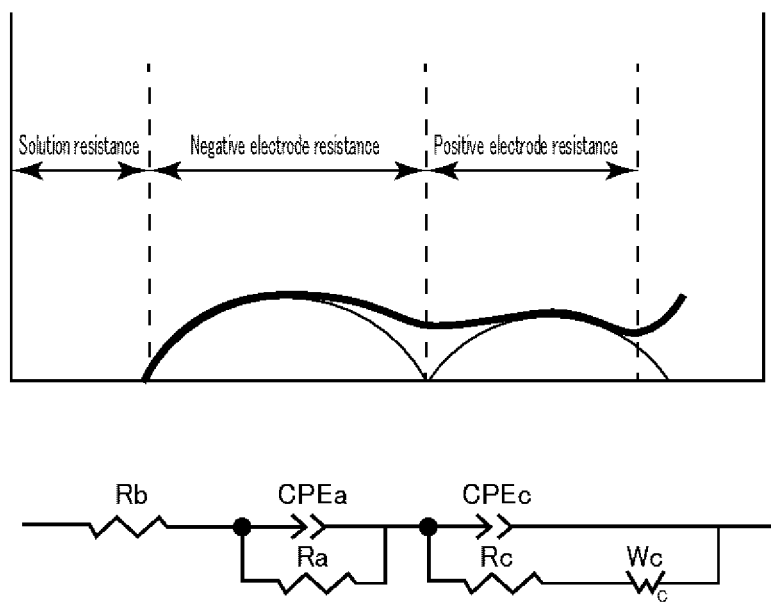
FIG. 5 is an equivalent circuit diagram and a Nyquist plot for use in a measurement example and an analysis for impedance evaluation.

The process for measuring positive electrode resistance is explained as follow. When the frequency dependence of a battery reaction is measured by a common alternating-current impedance method as an electrochemical evaluation approach, a Nyquist diagram based on a solution resistance, a negative electrode resistance and a negative electrode capacity, and a positive electrode resistance and a positive electrode capacity is obtained as shown in FIG. 5. The battery reaction at the electrode is composed of a resistance component with charge transfer and a capacitance component of an electric double layer, an electrical circuit that represents the components corresponds to a parallel circuit of resistance and capacitance, and the whole battery is represented by an equivalent circuit with a solution resistance connected in series to a parallel circuit of the negative electrode and the positive electrode. The Nyquist diagram measured with the use of the equivalent circuit can be subjected to a fitting calculation, thereby estimating the resistance component and the capacitance component. The positive electrode resistance is equal to the diameter of the semicircle on the lower frequency side in the Nyquist diagram obtained. Thus, the positive electrode resistance can be estimated by measuring the alternating-current impedance of the positive electrode prepared, and applying, to the obtained Nyquist diagram, a fitting calculation with the equivalent circuit.

The non-aqueous electrolyte secondary battery with the high-density and highly thermally stable positive electrode active material for a non-aqueous electrolyte secondary battery is, because the battery has excellent battery characteristics, preferred for a power source of a small portable electronic device (e.g., lap-top personal computer, a cellular phone unit) which always requires a high capacity.

In addition, the increase in the size of a battery for electric vehicles makes it difficult to ensure safety, thereby making an expensive protective circuit essential. In contrast, the non-aqueous electrolyte secondary battery has excellent safety performance without an increase in battery size, thereby not only making it easy to ensure safety, but also making it possible to simplify an expensive protective circuit, and thus further reduce the cost. Therefore, the battery is also preferred as a power source for electric vehicles. Furthermore, it is possible to reduce the size of the non-aqueous electrolyte secondary battery, and increase the output thereof, and the secondary battery is thus preferred as a power source for a power tools, hybrid vehicles and electric vehicles subjected to a restriction on mounting space.

In addition, the non-aqueous electrolyte secondary battery can be as not only a power source for electric vehicles that are driven purely by electric energy, but also a power source for so-called hybrid vehicles that use electric energy in conjunction with a combustion engine such as a gasoline engine and a diesel engine.

EXAMPLES

Examples 1 to 4 and Comparative Examples 1 to 5 will be each described in detail below with reference to Tables 1 and 2. It is to be noted that the present invention is not to be considered limited to these examples in any way.

Example 1

(Coprecipitation Step)

In Example 1, first, water was put in a reaction tank to the half of the tank volume, while stirring, the temperature in the tank was set to 40° C., an aqueous solution of 25% sodium hydroxide and 25% ammonia water were added thereto, and the pH value measured on the basis of a liquid temperature of 25° C. and the ammonia concentration in the solution were adjusted respectively to 12.8 and 10 g/L. To this solution, a 2.0 mol/L aqueous solution obtained by dissolving a nickel sulfate, a cobalt sulfate, a manganese sulfate, a zirconium sulfate (Ni:Co:Mn:Zr=38:32:30:0.5 in metal element molar ratio) in water, and the 25% ammonia water and the aqueous water of 25% sodium hydroxide were added at a constant rate, thereby bringing about crystallization for 2 minutes and 30 seconds while controlling the pH value to 12.8 (nucleation pH).

Thereafter, in accordance with Example 1, while lowering the oxygen concentration in the reaction tank through the distribution of a nitrogen gas, only the supply of the aqueous solution of 25% sodium hydroxide was temporarily stopped until the pH value measured on the basis of a liquid temperature of 25° C. reached 11.6 (particle growth pH), and after the pH value measured on the basis of a liquid temperature of 25° C. reached 11.6, the supply of the aqueous solution of 25% sodium hydroxide was again restarted. With the pH value kept controlled to 11.6, the crystallization for 2 hours was continued, the crystallization was stopped on reaching the full capacity in the reaction tank, and the stirring was stopped for leaving the solution still, thereby accelerating the precipitation of a product. After withdrawing half the supernatant, the crystallization was restarted. After the crystallization for 2 hours (4 hours in total), the crystallization was completed, the product was washed with water, filtrated, and dried.

In Example 1, the nickel-cobalt-manganese composite hydroxide represented by $Ni_{0.38}Co_{0.32}Mn_{0.30}Zr_{0.005}(OH)_{2+\alpha}$ ($0 \leq \alpha \leq 0.5$) was obtained by the process described above.

(Heat Treatment, Calcining Step)

In Example 1, the obtained composite hydroxide was subjected to a heat treatment at 150° C. for 12 hours, and then mixed sufficiently with a lithium carbonate weighed so as to achieve Li/Me=1.07, with the use of a shaker-mixer (from Willy A. Bachofen AG (WAB), TURBULA TypeT2C), thereby providing a mixture. This mixture was, in an air (oxygen: 21 volume %) flow, kept at 400° C. for 1 hour in the first calcining stage, and at 950° C. for 5 hours in the second calcining stage, and further subjected to grinding, thereby providing a positive electrode active material for a non-aqueous electrolyte secondary battery.

In connection with Example 1, Table 1 shows the average particle size, the value of [(d90−d10)/average particle size], Mn in the central part of the secondary particle/Mn in the outer-shell part thereof, Mn in the inner parts of the primary particles/Mn in the outer peripheral parts of the primary particles in the outer-shell part of the secondary particle, the pH of the positive electrode active material, the initial discharge capacity, and the positive electrode resistance value together for the obtained positive electrode active material for a non-aqueous electrolyte secondary battery. In addition, in connection with Example 1, Table 2 shows the results of determining the paste property and the output together for the obtained positive electrode active material. Furthermore, in connection with Example 1, FIG. 1 shows the result of SEM (scanning electron microscope JSM-6360LA from JEOL Ltd.) observation of the obtained positive electrode active material.

In Example 1, the average particle size was measured with a laser diffraction-scattering type particle size distribution measurement system (trade name: Microtrac HRA from NIKKISO CO., LTD.). In addition, the concentration ratio of manganese was obtained by EDX analysis with a transmission electron microscope (STEM (Scanning Transmission Electron Microscope)). In addition, in connection with Example 1, FIGS. 2 and 3 each show the result of STEM-EDX observation of the obtained positive electrode active material. FIG. 3 is an enlarged photograph of a part of FIG. 2.

Figure 2:
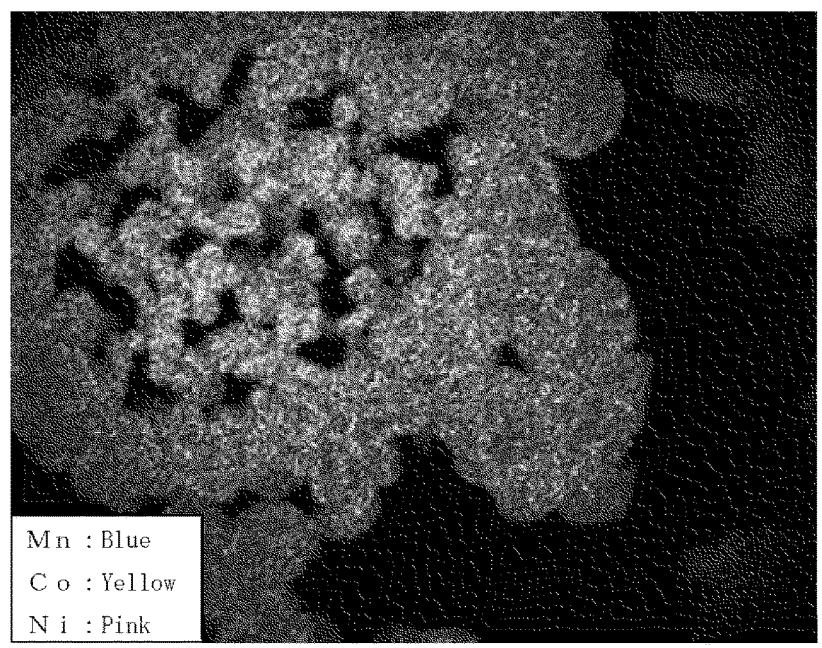
FIG. 2 is an STEM-EDX photograph showing substantially the entire positive electrode active material obtained in Example 1.
Figure 3:
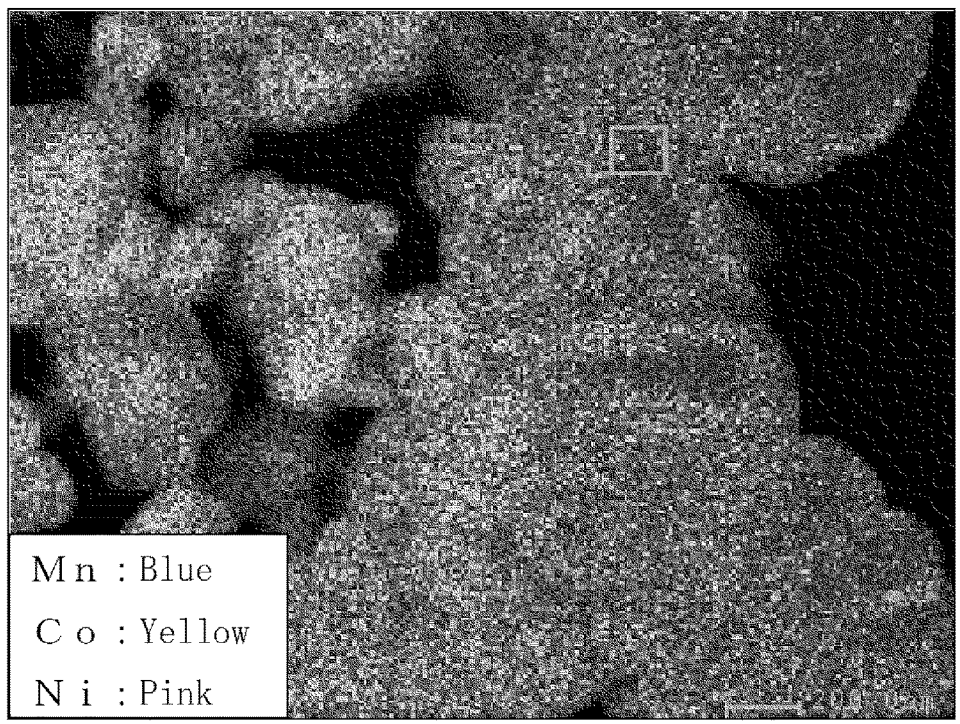
FIG. 3 is a partially enlarged photograph of FIG. 2, showing the positive electrode active material obtained in Example 1.

As shown in FIGS. 2 and 3, it has been determined that the manganese concentration in the outer-shell part of the secondary particle is high from the fact that there is more blue indicating manganese than yellow indicating cobalt and pink indicating nickel outside the obtained positive electrode active material. On the other hand, it has been determined that the manganese concentration in the central part of the secondary particle is lower than the manganese concentration in the outer-shell part thereof from the fact that there is more yellow and pink than blue inside the positive electrode active material. In addition, as shown in FIG. 2, it has been determined that the obtained positive electrode active material voids in the central parts of the secondary particles.

(Battery Evaluation)

Figure 4:
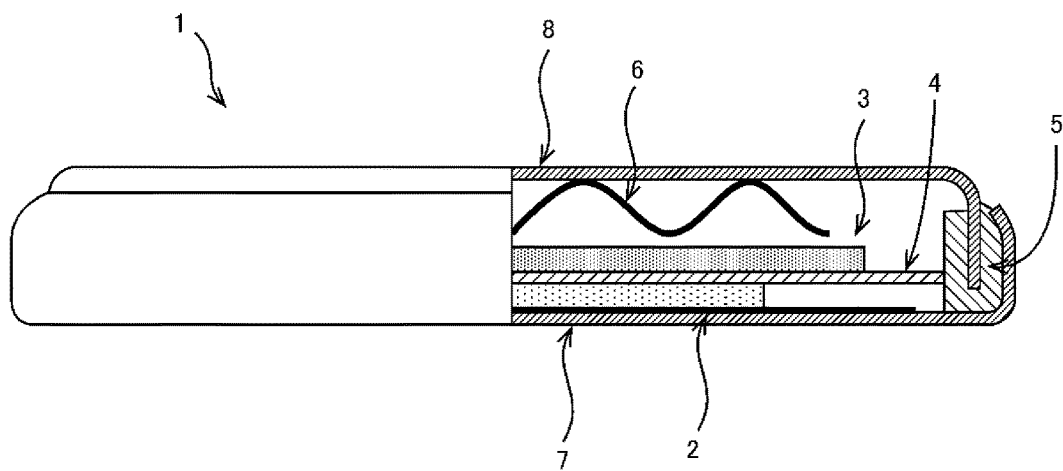
FIG. 4 is a schematic partial cross-sectional view of a coin-type battery for use in battery evaluation.

The evaluation of the obtained positive electrode active material for a non-aqueous electrolyte secondary battery was made by preparing a coin-type battery 1 as shown in FIG. 4, and measuring the charge-discharge capacity.

First, according to Example 1, 52.5 mg of the obtained positive electrode active material for non-aqueous electrolyte secondary battery, 15 mg of acetylene black, and 7.5 mg of a polytetrafluoroethylene resin (PTFE) were mixed, and pressed into a shape of 11 mm in diameter and 100 μm in thickness at a pressure of 100 MPa, thereby preparing a positive electrode (evaluation electrode) 2.

The prepared positive electrode 2 was dried for 12 hours at 120° C. in a vacuum drier. Then, the positive electrode 2 was used to prepare a type 2032 coin-type battery (hereinafter, referred to as "coin-type battery 1") in a glove box in an Ar atmosphere with a dew point controlled at −80° C. A Li metal of 17 mm in diameter×1 mm in thickness was used for a negative electrode 3. For the electrolytic solution, a mixed solution of equal parts of ethylene carbonate (EC) and diethyl carbonate (DEC) with 1 M of $LiClO_4$ as a supporting electrolyte (from TOMIYAMA PURE CHEMICAL INDUSTRIES, Ltd.) was used.

A polyethylene porous film of 25 μm in film thickness was used for a separator 4. In addition, the coin-type battery 1 has a gasket 5, and a wave washer 6, a positive electrode can 7, and a negative electrode can 8 are used for assembling the coin-like battery 1.

A charge-discharge TEST was carried out for measuring the discharge capacity obtained when the prepared coin-type battery 1 was left for approximately 24 hours, charged until reaching a cutoff voltage of 4.3 V with a current density adjusted to 0.1 mA/cm² for the positive electrode after the open circuit voltage OCV (open circuit voltage) was stabilized, and discharged until reaching a cutoff voltage of 3.0 V after a pause for 1 hour. A multichannel voltage/current generator (from ADVANTEST CORPORATION, R6741A) was used for the measurement of the charge-discharge capacity.

In accordance with Example 1, as a result of the charge-discharge TEST, the secondary battery using the obtained positive electrode active material for a non-aqueous electrolyte secondary battery was 179.8 mAh/g in initial discharge capacity.

In addition, the resistance value was measured by an alternating-current impedance method with the use of the coin-type battery 1 charged at a charging potential of 4.1 V. For the measurement, a frequency response analyzer and a potentiogalvanostat (from Solartron) were used, thereby the Nyquist plot shown in FIG. 5. This plot is expressed as the sum of characteristic curves indicating the solution resistance, the resistance and capacity of the negative electrode, and the resistance and capacity of the positive electrode, and a fitting calculation was thus made with the use of the equivalent circuit shown in FIG. 5, thereby evaluating the value of the positive electrode resistance. As a result, in accordance with Example 1, the value of the positive electrode resistance was 1.6Ω. The output characteristics were evaluated for positive electrode resistance on the basis of the following criteria.

⊚: less than 3 Ω
◯: 3Ω or more and less than 4 Ω
Δ: 4Ω or more and less than 7 Ω
x: 7Ω or more (Paste Property Evaluation)

The positive electrode active material, the acetylene black, and polyvinylidene fluoride (PVDF) were mixed to be 91:6:3 in mass ratio, and kneaded further with the addition of N-methyl-2-pyrrolidone (NMP) as a solvent for providing a viscosity of 4000 cP, thereby providing a paste, and thereafter, the paste was kept for 12 hours in a dry room (dew point: −30° C.). The viscosity was measured before and after keeping the paste, and evaluated for change in viscosity on the basis of the following criteria.

⊚: viscosity rise rate of 30% or less
◯: viscosity rise rate greater than the 30% and 100% or less
Δ: viscosity rise rate greater than the 100% and 200% or less
x: greater than 200%

Example 2

In Example 2, a positive electrode active material for a non-aqueous electrolyte secondary battery was obtained in the same way as in Example 1, except for keeping at 450° C. for 2 hours in the first calcining stage and keeping 900° C. for 4 hours in the second calcining stage in the calcining step.

In connection with Example 2, Table 1 shows the average particle size, the value of [(d90−d10)/average particle size], Mn in the central part of the secondary particle/Mn in the outer-shell part thereof, Mn in the inner parts of the primary particles/Mn in the outer peripheral parts of the primary particles in the outer-shell part of the secondary particle, the pH of the positive electrode active material, the initial discharge capacity, and the positive electrode resistance value together for the obtained positive electrode active material. In addition, in connection with Example 2, Table 2 shows the results of determining the paste property and the output together for the obtained positive electrode active material.

Example 3

In Example 3, a positive electrode active material for a non-aqueous electrolyte secondary battery was obtained in the same way as in Example 1, except for keeping at 500° C. for 2 hours in the first calcining stage and keeping 950° C. for 2 hours in the second calcining stage in the calcining step.

In connection with Example 3, Table 1 shows the average particle size, the value of [(d90−d10)/average particle size], Mn in the central part of the secondary particle/Mn in the outer-shell part thereof, Mn in the inner parts of the primary particles/Mn in the outer peripheral parts of the primary particles in the outer-shell part of the secondary particle, the pH of the positive electrode active material, the initial discharge capacity, and the positive electrode resistance value together for the obtained positive electrode active material. In addition, in connection with Example 3, Table 2 shows the results of determining the paste property and the output together for the obtained positive electrode active material.

Example 4

In Example 4, a positive electrode active material for a non-aqueous electrolyte secondary battery was obtained in the same way as in Example 1, except for keeping at 550° C. for 1 hour in the first calcining stage and keeping 900° C. for 1 hour in the second calcining stage in the calcining step.

In connection with Example 4, Table 1 shows the average particle size, the value of [(d90−d10)/average particle size], Mn in the central part of the secondary particle/Mn in the outer-shell part thereof, Mn in the inner parts of the primary particles/Mn in the outer peripheral parts of the primary particles in the outer-shell part of the secondary particle, the pH of the positive electrode active material, the initial discharge capacity, and the positive electrode resistance value together for the obtained positive electrode active material. In addition, in connection with Example 4, Table 2 shows the results of determining the paste property and the output together for the obtained positive electrode active material.

Comparative Example 1

In Comparative Example 1, a positive electrode active material for a non-aqueous electrolyte secondary battery was obtained in the same way as in Example 1, except for keeping 1050° C. for 10 hours without conducting the first calcining stage in the second calcining stage in the calcining step.

In connection with Comparative Example 1, Table 1 shows the average particle size, the value of [(d90−d10)/average particle size], Mn in the central part of the secondary particle/Mn at the surface thereof, Mn in the inner parts of the primary particles/Mn in the outer peripheral parts of the primary particles in the outer-shell part of the secondary particle, the pH of the positive electrode active material, the initial discharge capacity, and the positive electrode resistance value together for the obtained positive electrode active material. In addition, in connection with Comparative Example 1, Table 2 shows the results of determining the paste property and the output together for the obtained positive electrode active material.

Comparative Example 2

In Comparative Example 2, a positive electrode active material for a non-aqueous electrolyte secondary battery was obtained in the same way as in Example 1, except for keeping at 650° C. for 3 hours in the first calcining stage and keeping 950° C. for 6 hours in the second calcining stage in the calcining step.

In connection with Comparative Example 2, Table 1 shows the average particle size, the value of [(d90−d10)/average particle size], Mn in the central part of the secondary particle/Mn in the outer-shell part thereof, Mn in the inner parts of the primary particles/Mn in the outer peripheral parts of the primary particles in the outer-shell part of the secondary particle, the pH of the positive electrode active material, the initial discharge capacity, and the positive electrode resistance value together for the obtained positive electrode active material. In addition, in connection with Comparative Example 2, Table 2 shows the results of determining the paste property and the output together for the obtained positive electrode active material.

Comparative Example 3

In Comparative Example 3, a positive electrode active material for a non-aqueous electrolyte secondary battery was obtained in the same way as in Example 1, except for keeping at 650° C. for 6 hours in the first calcining stage and keeping 900° C. for 3 hours in the second calcining stage in the calcining step.

In connection with Comparative Example 3, Table 1 shows the average particle size, the value of [(d90–d10)/average particle size], Mn in the central part of the secondary particle/Mn in the outer-shell part thereof, Mn in the inner parts of the primary particles/Mn in the outer peripheral parts of the primary particles in the outer-shell part of the secondary particle, the pH of the positive electrode active material, the initial discharge capacity, and the positive electrode resistance value together for the obtained positive electrode active material. In addition, in connection with Comparative Example 3, Table 2 shows the results of determining the paste property and the output together for the obtained positive electrode active material.

Comparative Example 4

In Comparative Example 4, a positive electrode active material for a non-aqueous electrolyte secondary battery was obtained in the same way as in Example 1, except for keeping at 550° C. for 5 hours in the first calcining stage and keeping 800° C. for 3 hours in the second calcining stage in the calcining step.

In connection with Comparative Example 4, Table 1 shows the average particle size, the value of [(d90–d10)/average particle size], Mn in the central part of the secondary particle/Mn in the outer-shell part thereof, Mn in the inner parts of the primary particles/Mn in the outer peripheral parts of the primary particles in the outer-shell part of the secondary particle, the pH of the positive electrode active material, the initial discharge capacity, and the positive electrode resistance value together for the obtained positive electrode active material. In addition, in connection with Comparative Example 4, Table 2 shows the results of determining the paste property and the output together for the obtained positive electrode active material.

Comparative Example 5

In Comparative Example 5, a positive electrode active material for a non-aqueous electrolyte secondary battery was obtained in the same way as in Example 1, except for keeping at 550° C. for 5 hours in the first calcining stage and keeping 1000° C. for 7 hours in the second calcining stage in the calcining step.

In connection with Comparative Example 5, Table 1 shows the average particle size, the value of [(d90–d10)/average particle size], Mn in the central part of the secondary particle/Mn in the outer-shell part thereof, Mn in the inner parts of the primary particles/Mn in the outer peripheral parts of the primary particles in the outer-shell part of the secondary particle, the pH of the positive electrode active material, the initial discharge capacity, and the positive electrode resistance value together for the obtained positive electrode active material. In addition, in connection with Comparative Example 5, Table 2 shows the results of determining the paste property and the output together for the obtained positive electrode active material.

TABLE 1

| | Positive electrode active material [μm] | | | | | | |
|---|---|---|---|---|---|---|---|
| | Average particle size [μm] | (d90 − d10)/ average particle size | Mn in the central part/ Mn in the outer-shell part of the secondary particle | Mn in the inner parts/Mn in the outer peripheral parts of the primary particles constituting the outer-shell part of the secondary particle | pH | Initial discharge capacity [mAh·g$^{-1}$] | Positive electrode resistance [Ω] |
| Example 1 | 4.5 | 0.40 | 0.7 | 2.5 | 11.6 | 179.8 | 1.6 |
| Example 2 | 4.6 | 0.42 | 0.3 | 2.0 | 11.1 | 178.8 | 3.6 |
| Example 3 | 4.7 | 0.44 | 0.5 | 1.5 | 11.2 | 175.4 | 4.0 |
| Example 4 | 6.2 | 0.41 | 0.6 | 2.2 | 11.1 | 176.3 | 2.2 |
| Comparative Example 1 | 4.7 | 0.55 | 1.0 | 1.0 | 12.1 | 180.1 | 8.6 |
| Comparative Example 2 | 4.8 | 0.42 | 0.9 | 1.2 | 11.8 | 174.2 | 5.5 |
| Comparative Example 3 | 4.9 | 0.43 | 1.0 | 1.1 | 12.1 | 179.6 | 6.5 |
| Comparative Example 4 | 5.3 | 0.45 | 1.0 | 1.6 | 12.3 | 165.4 | 7.1 |
| Comparative Example 5 | 5.5 | 0.50 | 1.0 | 1.7 | 12.1 | 178.2 | 4.0 |

TABLE 2

| | Positive electrode active material | |
|---|---|---|
| | Paste property | Output |
| Example 1 | Δ | ⊚ |
| Example 2 | ⊚ | ○ |
| Example 3 | ○ | Δ |
| Example 4 | ○ | ⊚ |
| Comparative Example 1 | X | X |
| Comparative Example 2 | Δ | Δ |
| Comparative Example 3 | X | Δ |
| Comparative Example 4 | X | X |
| Comparative Example 5 | X | Δ |

As just described, in accordance with Example 1 to Example 4, the positive electrode active materials have been each obtained where the ratio of the manganese concentration in the inner parts of the primary particles to the manganese concentration in the outer peripheral parts thereof is 1.5 to 2.5, and the ratio of the manganese concentration in the central part of the secondary particle to the manganese concentration in the outer-shell part thereof is 0.3 to 0.7, as shown in Table 1.

As a result, it has been successfully confirmed that the respective positive electrode active materials obtained in accordance with Example 1 to Example 4 are each useful as a secondary battery which has a high initial discharge capacity, a low positive electrode resistance, and great output characteristics without gelation in the preparation of a paste, as shown in Table 1 and Table 2.

On the other hand, in accordance with Comparative Example 1 to Comparative Example 5, the positive electrode active materials were obtained which failed to meet any of: the requirement that the ratio of the manganese concentration in the inner parts of the primary particles to the manganese concentration in the outer peripheral parts thereof is 1.5 to 2.5; and the requirement that the ratio of the manganese concentration in the central part of the secondary particle to the manganese concentration in the outer-shell part thereof is 0.3 to 0.7, as shown in Table 1.

As a result, the respective positive electrode active materials obtained in accordance with Comparative Example 1 to Comparative Example 5 required higher calcination temperatures or longer calcination times than in Example 1 to Example 4, as shown in Table 1 and Table 2, and sintering proceeded to either the substantially constant ratio of the manganese concentration in the inner parts of the primary particles to the manganese concentration in the outer peripheral parts thereof, or the substantially constant ratio of the manganese concentration in the central part of the secondary particle to the manganese concentration in the outer-shell part thereof, thereby increasing the alkalinity of the positive electrode active material, and thus failing to suppress gelation in the preparation of the paste. In addition, in these positive electrode active materials, the increased manganese concentration in the outer peripheral parts of the primary particles has increased the positive electrode resistance value. Therefore, the failure to obtain desired positive electrode active materials has been determined.

GLOSSARY OF DRAWING REFERENCES

1 ... coin-type battery, 2 ... positive electrode (electrode for evaluation), 3 ... carbon negative electrode, 4 ... separator, 5 ... gasket, 6 ... wave washer, 7 ... positive electrode can, 8 ... negative electrode can,

The invention claimed is:

1. A positive electrode active material for a non-aqueous electrolyte secondary battery, the positive electrode active material comprising hexagonal lithium-nickel-cobalt-manganese composite oxide particles represented by the general formula: $Li_{1+s}Ni_xCo_yMn_zM_tO_2$
   wherein:
   s, x, y, z, and t in the formula fall within the ranges of: $-0.05 \leq s \leq 0.20$; $0.1 \leq x \leq 0.7$; $0.1 \leq y \leq 0.5$; $0.1 \leq z \leq 0.5$; and $0 \leq t \leq 0.05$, and x, y, z, and t meet x+y+z+t=1,
   M in the formula represents one or more additive elements selected from the group consisting of Ca, Mg, Al, Ti, V, Cr, Zr, Nb, Mo, Hf, Ta, and W,
   the lithium-nickel-cobalt-manganese composite oxide particles have a layered structure comprising secondary particles with aggregated primary particles,
   the secondary particles each comprises an outer-shell part that has a high manganese concentration and a central part that has a low manganese concentration that is lower than the high manganese concentration in the outer-shell part of the secondary particle,
   the primary particles constitute the outer-shell parts of the secondary particles,
   each of the primary particles comprises an outer peripheral part that has a low manganese concentration and an inner part that has a high manganese concentration, and
   a ratio of the high manganese concentration in the inner part of the primary particle to the low manganese concentration in the outer peripheral part of the primary particle is in a range of from 1.5 to 2.5.

2. The positive electrode active material for a non-aqueous electrolyte secondary battery according to claim 1, wherein a ratio of the low manganese concentration in the central part of the secondary particle to the high manganese concentration in the outer-shell part of the secondary particle is 0.3 to 0.7.

3. The positive electrode active material for a non-aqueous electrolyte secondary battery according to claim 1, wherein the positive electrode active material is 3 μm to 20 μm in average particle size.

4. The positive electrode active material for a non-aqueous electrolyte secondary battery according to claim 1, wherein the primary particles are 0.2 μm to 0.5 μm in average particle size.

5. The positive electrode active material for a non-aqueous electrolyte secondary battery according to claim 1, wherein the positive electrode active material has a breadth of a particle size distribution, [(d90−d10)/average particle size], that is 0.60 or less.

6. The positive electrode active material for a non-aqueous electrolyte secondary battery according to claim 1, wherein the secondary particles have voids in the central parts of the secondary particles.

7. A process for producing the positive electrode active material for a non-aqueous electrolyte secondary battery according to claim 1
   the process comprises:
   a crystallization step of obtaining nickel-cobalt-manganese composite hydroxide particles represented by the general formula: $Ni_xMn_zM_t(OH)_{2+\alpha}$, wherein x, y, z, and t in the formula fall within the ranges of: $0.1 \leq x \leq 0.7$; $0.1 \leq y \leq 0.5$; $0.1 \leq z \leq 0.5$; and $0 \leq t \leq 0.05$, x, y, z, and t meet x+y+z+t=1, and M in the formula represents one or more additive elements selected from the group consisting of Ca, Mg, Al, Ti, V, Cr, Zr, Nb, Mo, Hf, Ta, and W;
   a mixing step of mixing the nickel-cobalt-manganese composite hydroxide particles with a lithium compound such that a ratio of the atom number of lithium will be in a range of from 0.95 to 1.20 with respect to a total of the atom numbers of metal elements other than lithium, thereby providing a lithium mixture; and
   a calcining step in an oxidizing atmosphere including: (i) elevating a temperature of the lithium mixture from room temperature to a temperature in a range of from 400° C. to 550° C. over 0.5 hours to 1.5 hours and keeping the elevated temperature for 1 hour to 5 hours, and (ii) further elevating the temperature of the lithium mixture to a temperature in a range of from 850° C. to 950° C. over 0.5 hours to 1.0 hour and keeping the elevated temperature for 1 hour to 5 hours, thereby forming the lithium-nickel-cobalt-manganese composite oxide particles.

8. The process for producing the positive electrode active material for a non-aqueous electrolyte secondary battery according to claim 7, the process further comprising, before the mixing step, a heat treatment step of applying a heat treatment at a temperature in a range of from 105° C. to 150° C. to the nickel-cobalt-manganese composite hydroxide particles.

9. The process for producing a positive electrode active material for a non-aqueous electrolyte secondary battery according to claim 7, the process further comprising a grinding step of grinding the lithium-nickel-cobalt-manganese composite oxide particles obtained in the calcining step.

10. A non-aqueous electrolyte secondary battery comprising a positive electrode, a negative electrode, a separator, and a non-aqueous electrolyte, wherein the positive electrode is the positive electrode active material for a non-aqueous electrolyte secondary battery according to claim 1.

* * * * *